United States Patent
Britton et al.

(10) Patent No.: US 12,509,307 B2
(45) Date of Patent: Dec. 30, 2025

(54) SYNCHRONIZATION APPARATUSES AND METHODS OF USE

(71) Applicant: Toyota Motor Engineering & Manufacturing North America, Inc., Plano, TX (US)

(72) Inventors: David A. Britton, Florence, KY (US); Harrison W. Saunders, Georgetown, KY (US); Jeffrey W. DeBruler, Cynthiana, KY (US); Michael S. Haggan, Lexington, KY (US); Jeffery S. Smith, Nicholasville, KY (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 18/582,028

(22) Filed: Feb. 20, 2024

(65) Prior Publication Data
US 2025/0263250 A1    Aug. 21, 2025

(51) Int. Cl.
| | | |
|---|---|---|
| *B65G 47/61* | (2006.01) | |
| *B25H 1/08* | (2006.01) | |
| *B25H 1/10* | (2006.01) | |
| *B62D 65/18* | (2006.01) | |
| *B65G 47/50* | (2006.01) | |

(52) U.S. Cl.
CPC .............. *B65G 47/61* (2013.01); *B25H 1/10* (2013.01); *B65G 47/50* (2013.01); *B25H 1/08* (2013.01); *B62D 65/18* (2013.01)

(58) Field of Classification Search
CPC .......... B25H 1/10; B25H 1/0007; B25H 1/08; B65G 47/50; B65G 47/61; B62D 65/18
USPC ......................................................... 198/434
See application file for complete search history.

(56) References Cited

U.S. PATENT DOCUMENTS

| | | | |
|---|---|---|---|
| 3,101,553 A * | 8/1963 | Rish ................. | G01B 5/255 33/645 |
| 5,524,748 A * | 6/1996 | McTaggart ............ | B65G 25/02 198/774.3 |
| 10,894,313 B2 | 1/2021 | Meyer | |
| 11,117,752 B2 * | 9/2021 | Foster ................ | B61B 13/12 |
| 12,227,366 B2 * | 2/2025 | Holland ............... | B66B 21/10 |
| 2021/0179407 A1 * | 6/2021 | Britton ................ | B23P 21/00 |
| 2023/0356961 A1 | 11/2023 | Foster et al. | |

FOREIGN PATENT DOCUMENTS

| | | |
|---|---|---|
| CN | 111674493 A | 9/2020 |
| FR | 2714035 A1 | 6/1995 |
| KR | 101149804 B1 | 5/2012 |

* cited by examiner

*Primary Examiner* — James R Bidwell
(74) *Attorney, Agent, or Firm* — Dinsmore & Shohl LLP

(57) ABSTRACT

A synchronization device for synchronizing a hanging dolly assembly to a conveyor includes a first pole body assembly comprising a first pole body and a first spring that is configured to bias the first pole body in a first direction and a second pole body assembly with a second pole body slidably connected to the first pole body and a second spring that is configured to bias the second pole body in a second direction opposite the first direction.

17 Claims, 3 Drawing Sheets

SYNCHRONIZATION APPARATUSES AND METHODS OF USE

TECHNICAL FIELD

The present specification generally relates to dolly apparatuses for an assembly line and, more specifically, to synchronization devices for synchronizing overhead dolly apparatuses to a conveyor line.

BACKGROUND

Dolly structures may be used on an assembly line, such as a vehicle assembly line. It may be desirable to synchronize the dolly structures with a conveyor so that the dolly structure moves along the assembly line with the conveyor. Such a synchronized arrangement can facilitate an assembly operation on a structure moving with the conveyor.

What is needed are synchronization apparatuses for synchronizing movement of a dolly apparatus with conveyors.

SUMMARY

In one embodiment, a synchronization device for synchronizing a hanging dolly assembly to a conveyor includes a first pole body assembly comprising a first pole body and a first spring that is configured to bias the first pole body in a first direction and a second pole body assembly with a second pole body slidably connected to the first pole body and a second spring that is configured to bias the second pole body in a second direction opposite the first direction.

In another embodiment, a dolly assembly includes a frame and a synchronization device mounted to the frame. The synchronization device includes a first pole body assembly comprising a first pole body and a first spring that is configured to bias the first pole body in a first direction and a second pole body assembly with a second pole body slidably connected to the first pole body and a second spring that is configured to bias the second pole body in a second direction opposite the first direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to dolly apparatuses with synchronization devices that include a first pole body assembly including a first pole body and a first spring that is configured to bias the first pole body in a first direction and a second pole body assembly with a second pole body and a second spring that is configured to bias the second pole body in a second direction opposite the first direction. The dolly apparatuses may be used on a vehicle assembly line, as an example. The dolly apparatus may be a wheeled device that is moveable along an elevated track that conveys the dolly apparatuses in a conveying direction. The dolly apparatuses can synchronize with a conveyor beneath the elevated track to move in the conveying direction with the conveyor during an assembly process. Once the assembly process is complete, the dolly apparatuses may be uncoupled from the conveyor using the synchronization device and then moved in an upstream direction toward a next vehicle part for another assembly process.

Figure 1:
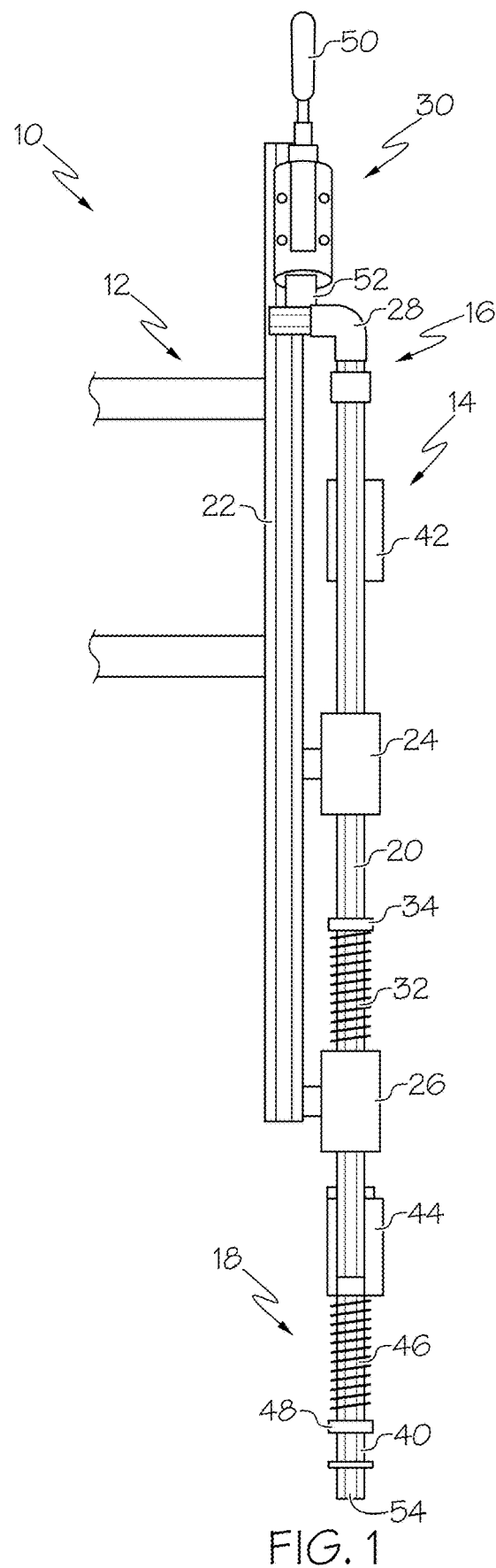
FIG. 1 is a diagrammatic view of part of a dolly apparatus including a synchronization device in a desynchronized configuration, according to one or more embodiments shown and described herein.
Figure 2:
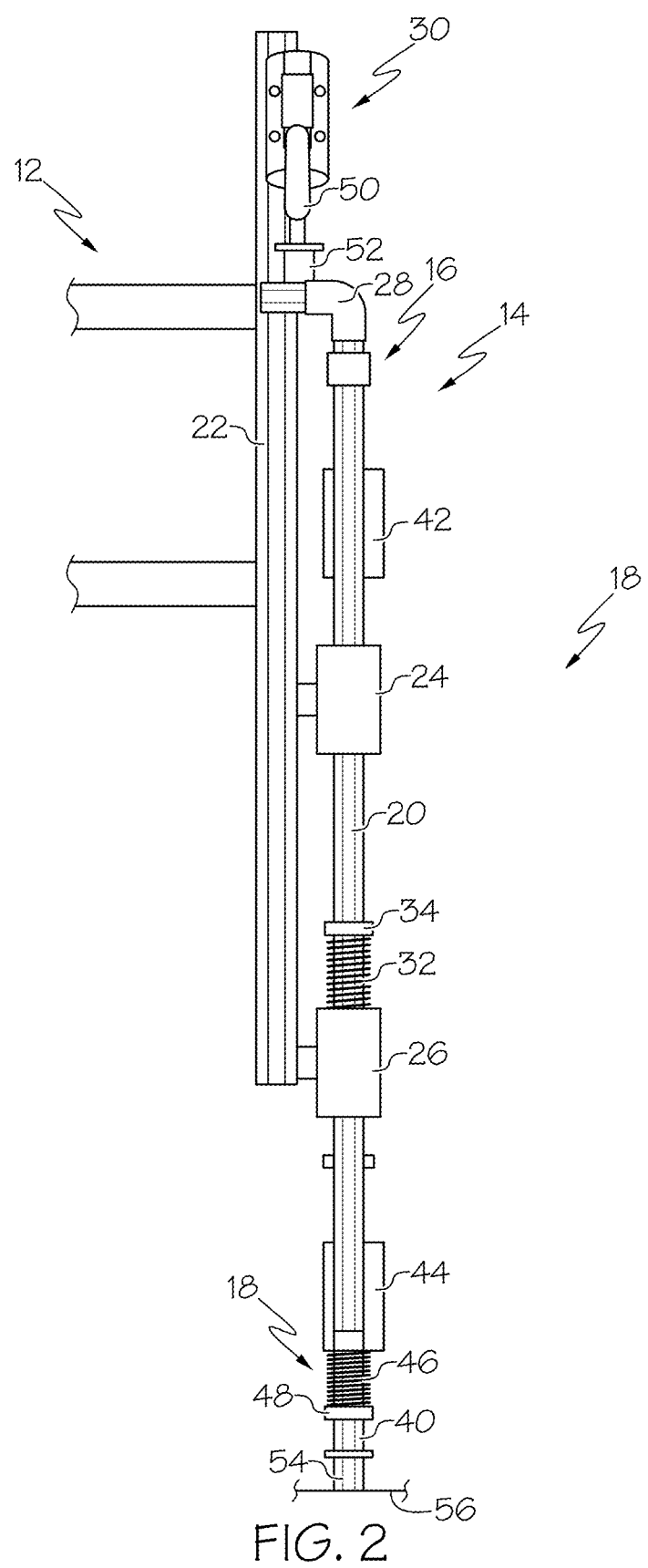
FIG. 2 is a diagrammatic view of the part of the dolly apparatus of FIG. 1 including the synchronization device in a synchronized configuration, according to one or more embodiments shown and described herein.
Figure 3:
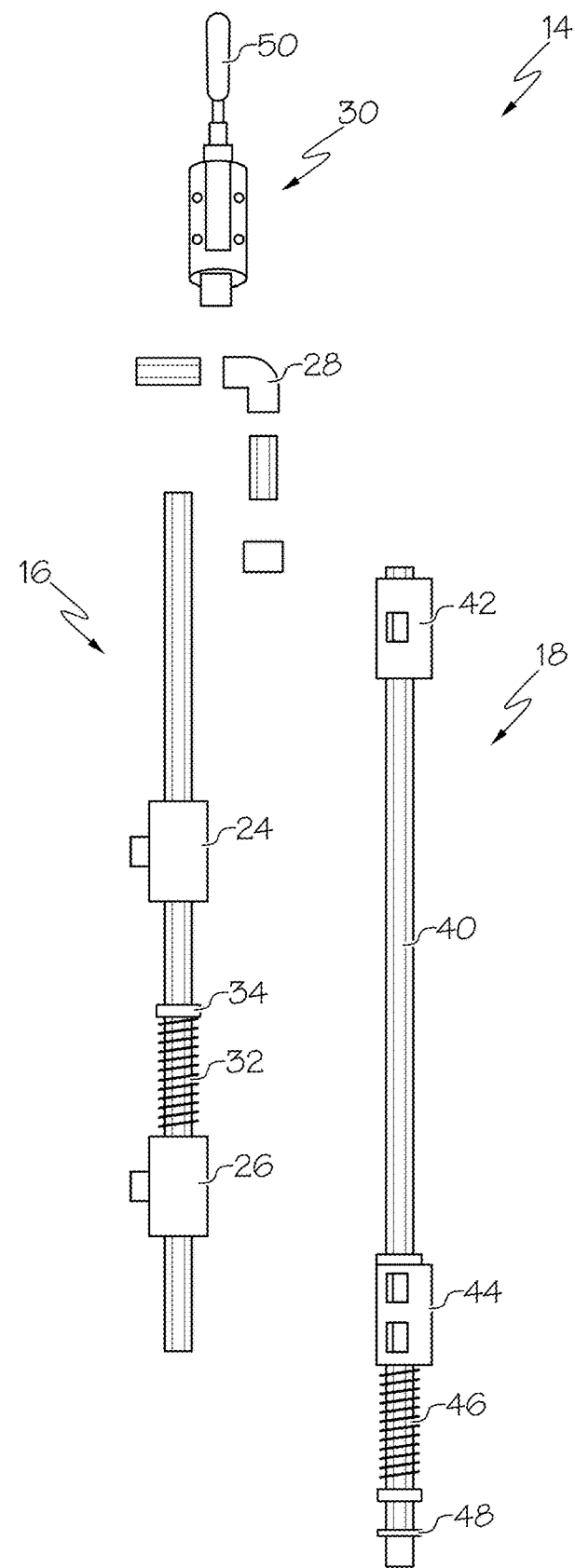
FIG. 3 is a diagrammatic, exploded view of the synchronization device of FIG. 1, according to one or more embodiments shown and described herein.

Referring to FIGS. 1-3, a dolly apparatus 10 includes a frame 12 and a synchronization device 14 that is mounted to the frame 12. In particular, the synchronization deice 14 includes a first pole body assembly 16 and a second pole body assembly 18 that is connected to the first pole body assembly 16. The first pole body assembly 16 includes a first pole body 20 that is slidably connected to a vertical frame member 22 of the frame 12 using linear mounts 24 and 26 (e.g., linear bearings) that are configured to allow the first pole body 16 to slide relative to the frame member 20. The first pole body assembly 16 further includes a spacer connector 28 that extends laterally outward from the first pole body 20 beneath an actuation assembly 30 fixedly mounted to the frame member 22 that is used to move the first pole body 20 between a retracted configuration (FIG. 1) and an extended configuration (FIG. 2).

The first pole body assembly 16 further includes a spring 32 that is sandwiched between a flange 34 carried by the first pole body 20 and the linear mount 26. The linear mount 26 has an inner diameter that is sized smaller than an outer diameter of the spring 32 and the flange 34 such that the spring 32 and flange 34 cannot pass through the linear mount 26. As the flange 34 is pushed toward the linear mount 36, the spring 32 compresses and applies a biasing force against the flange 34 mounted to the first pole body 20.

The second pole body assembly 18 includes a second pole body 40 that is slidably mounted to the first pole body 20 using linear mounts 42 and 44 (e.g., linear bearings) that are configured to allow the second pole body 40 to slide relative to the first pole body 20. The linear mounts 42 and 44 are fixedly mounted to the first pole body 20 such that they move along with the first pole body 20.

The second pole body assembly 18 further includes a spring 46 that is sandwiched between a flange 48 carried by the second pole body 40 and the linear mount 44. The linear mount 44 also has an inner diameter that is sized smaller than an outer diameter of the spring 46 and the flange 48 such that the spring 46 and flange 48 cannot pass through the linear mount 44. As the linear mount 44 is pushed toward the spring 46, the spring 46 compresses and applies a biasing force against the linear mount 44 mounted to the first pole body 20.

FIGS. 1 and 2 illustrate operation of the synchronization device 14. Referring first to FIG. 1, the synchronization device 14 is illustrated in an unsynchronized, rest configuration with a handle 50 of the actuation assembly 30 in an unactuated, initial position where a pusher 52 is in a retracted position. In the rest configuration, the first pole body 20 is in the retracted configuration, which also places the second pole body 40 in a retracted configuration and no force is applied on an end 54 of the second pole body 40.

When the dolly apparatus 10 is in a desired position above a moving or stationary conveyor (represented by line 56 in FIG. 2), the handle 50 can be actuated by pushing the handle 50 down, which causes the pusher 52 to extend and push the spacer connecter 28 down relative to the frame 12 as shown by FIG. 2. Pushing the spacer connector 28 pushes the entire first pole body 20 down through the linear mounts 24 and 26, which also pushes the flange 34 closer to the linear mount 26 and compresses the spring 32. Because the position of the linear mount 26 is fixed relative to the frame 12 and the position of the flange 34 is not fixed, the spring 32 applies an upward biasing force against the flange 34 and first pole body assembly 16.

The linear mounts 42 and 44 are fixedly connected to the first pole body 20 and move down therewith, which causes the linear mount 44 to move toward the flange 48 and pushes on the spring 46. The second pole body 40 can slide downward within the linear mounts 42 as the first pole body assembly 16 is moved down toward the extended position. The second pole body assembly 18 moves downward toward the extended position on the end 54 contacts the conveyor 56, which impedes further extension of the second pole body 40. As the linear mount 44 continues downward movement, the spring 46 is compressed until the handle 50 of the actuation assembly 30 locks into place, applying a downward biasing force against the flange 48, the second pole body assembly 18 and the conveyor 56 thereby locking the dolly apparatus 10 to the conveyor 56. Moving the handle 50 back to its initial position allows the springs to force the first and second pole body assemblies 16 and 18 back to their retracted configurations and releases the dolly apparatus 10 from the conveyor 56 so that the dolly apparatus 10 can then be moved relative to movement of the conveyor 56.

The above-described synchronization devices can allow for more ergonomic synchronization between a hanging dolly assembly and a moving conveyor. The synchronization device is spring-loaded to apply a constant downward pressure against the conveyor and constant upward pressure against the dolly assembly simultaneously, which can allow for synchronization and desynchronization of the dolly assembly easily, with reduced concern for movement of the synchronization device before, during and and after an assembly process.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A synchronization device for synchronizing a hanging dolly assembly to a conveyor, the synchronization device comprising:
    a first pole body assembly comprising a first pole body and a first spring that is configured to bias the first pole body in a first direction; and
    a second pole body assembly with a second pole body slidably connected to the first pole body and a second spring that is configured to bias the second pole body in a second direction opposite the first direction.

2. The synchronization device of claim 1, wherein the first pole body assembly comprises a linear mount that is configured to slidably receive the first pole body, the linear mount configured to mount to the hanging dolly assembly.

3. The synchronization device of claim 2, wherein the linear mount is a first linear mount, the first pole body assembly comprising a second linear mount that is configured to slidably receive the first pole body, the second linear mount configured to mount to the hanging dolly assembly.

4. The synchronization device of claim 2, wherein the linear mount is a first linear mount, the second pole body assembly comprising a second linear mount that is configured to slidably receive the second pole body, the second linear mount mounted to the first pole body.

5. The synchronization device of claim 4, wherein the first pole body assembly comprises a spring located between the first linear mount and a flange mounted on the first pole body.

6. The synchronization device of claim 5, wherein the second pole body assembly comprises another spring located between the second linear mount and another flange mounted on the second pole body.

7. The synchronization device of claim 1 further comprising an actuation assembly comprising a pusher that is configured to push the first pole body away from the actuation assembly.

8. A dolly assembly comprising:
    a frame; and
    a synchronization device mounted to the frame, the synchronization device comprising:
        a first pole body assembly comprising a first pole body and a first spring that is configured to bias the first pole body in a first direction; and
        a second pole body assembly with a second pole body slidably connected to the first pole body and a second spring that is configured to bias the second pole body in a second direction opposite the first direction.

9. The dolly assembly of claim 8, wherein the first pole body assembly comprises a linear mount that is configured to slidably receive the first pole body, the linear mount configured to mount to the hanging dolly assembly.

10. The dolly assembly of claim 9, wherein the linear mount is a first linear mount, the first pole body assembly comprising a second linear mount that is configured to slidably receive the first pole body, the second linear mount configured to mount to the hanging dolly assembly.

11. The synchronization device of claim 9, wherein the linear mount is a first linear mount, the second pole body assembly comprising a second linear mount that is configured to slidably receive the second pole body, the second linear mount mounted to the first pole body.

12. The synchronization device of claim 11, wherein the first pole body assembly comprises a spring located between the first linear mount and a flange mounted on the first pole body.

13. The synchronization device of claim 12, wherein the second pole body assembly comprises another spring located between the second linear mount and another flange mounted on the second pole body.

14. The synchronization device of claim 8 further comprising an actuation assembly comprising a pusher that is configured to push the first pole body away from the actuation assembly.

15. A method of synchronizing a hanging dolly assembly to a conveyor, the method comprising:
- moving the hanging dolly assembly to a desired location along a conveyor; and
- engaging the conveyor with a synchronization device that is mounted to the hanging dolly assembly with the synchronization device in a synchronized configuration, the synchronization device comprising:
  - a first pole body assembly comprising a first pole body and a first spring that is configured to bias the first pole body in a first direction; and
  - a second pole body assembly with a second pole body slidably connected to the first pole body and a second spring that is configured to bias the second pole body in a second direction opposite the first direction.

16. The method of claim 15 further comprising biasing the first pole body in an upward direction using the first spring with the synchronization device in the synchronized configuration.

17. The method of claim 15 further comprising biasing the second pole body in a downward direction using the second spring with the synchronization device in the synchronized configuration.

\* \* \* \* \*